Jan. 26, 1965   H. POMERANZ   3,166,950

SPEED WARNING DEVICE

Filed Feb. 19, 1962

INVENTOR.
Herbert Pomeranz
BY William H. Saltzman
ATTORNEY.

United States Patent Office 3,166,950
Patented Jan. 26, 1965

3,166,950
SPEED WARNING DEVICE
Herbert Pomeranz, 21 Clifton Ave., Yonkers, N.Y.
Filed Feb. 19, 1962, Ser. No. 174,163
3 Claims. (Cl. 74—526)

This invention relates to a device for motor vehicle accelerators. More particularly, this invention relates to a spring attachment for accelerator pedals of motor vehicles, which is intended to promote safe driving.

A substantial portion of automobile travel is now done on the many high speed super highways prevalent throughout the nation. The accident rate on these highways and elsewhere is quite high, and one recognized cause of such accidents is the unsafe high speed at which the vehicles involved were traveling. It is well recognized that heretofore, drivers operating motor vehicles at high speeds for extended periods of time, tend to increase the speed of their motor vehicles without realizing it, by unconsciously depressing the accelerator pedal further and further towards the floorboard of the motor vehicle. This appears to be caused by a combination of driver fatigue and lack of notice that the accelerator is being depressed further, thereby causing the motor vehicle to be operated at an unsafe rate of speed.

An object of this invention is to provide a device which will prevent a motor vehicle from being negligently and unknowingly operated at too high a rate of speed.

A further object of this invention is to provide a device which will signal the driver when he is operating his motor vehicle at unsafe speeds.

A still further object of this invention is to provide a device which will prevent the accelerator pedal from remaining depressed when there is little or no pressure thereon.

A still further object of the invention is to provide a device of the above mentioned character which is simple in construction so that it can be manufactured at low cost and may be easily installed by a motor vehicle owner.

Further objects and advantages of the invention will appear during the course of the following part of this specification, wherein the details of preferred construction and mode of operation are described with reference to the accompanying drawing in which.

Figure 1:
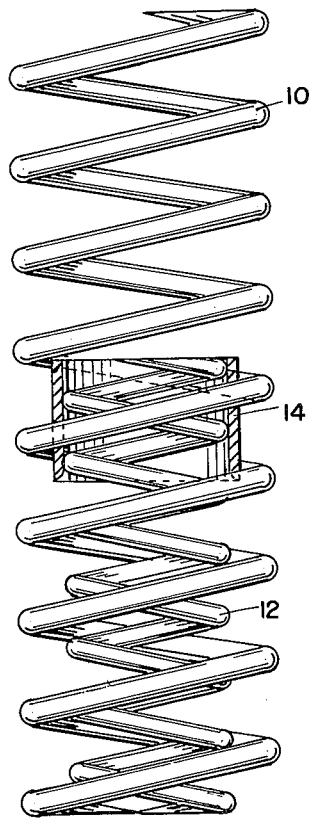
FIGURE 1 is a longitudinal view of the device.
Figure 2:
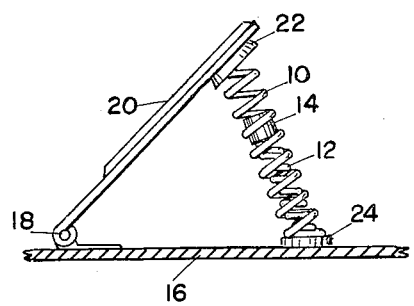
FIGURE 2 is a side view of the device as fitted on the accelerator pedal of an automobile.

Referring to the figures setting forth the preferred embodiment of the invention, by characters of reference, 24 indicates a base plate which may be secured to the floorboard 16 of the motor vehicle, and to which are secured concentric helical springs 10 and 12. The exterior and longer helical spring 10, may be attached at its other end to a keeper plate 22 which may be secured to the accelerator pedal 20 which is hingedly connected at hinge 18 to the motor vehicle floorboard 16.

In practice, the operator of a motor vehicle to which this device is attached will depress the accelerator pedal 20 thereby causing the exterior concentric helical spring 10 to exert an upward pressure against the underside of the accelerator pedal and thence to the operator's foot. As the pedal is depressed further downwards towards the floorboard, the interior concentric helical spring 12 is actuated, when the accelerator pedal commences to cause the said interior helical spring to be compressed thus causing an increased upward pressure to be transmitted to the driver's foot. Contact of the interior helical spring with the under side of the accelerator pedal is made by a sleevelike keeper ring 14 attached to the interior concentric helical spring.

This keeper ring 14 may serve a dual purpose: to stabilize the interior helical spring and keep it in position and secondly, the keeper ring may be adjusted upwards or downwards to determine at what point in the accelerator's arc of travel contact with the interior helical spring is to be made. The adjustment can be made for each car according to the speed at which the driver desires the interior helical spring's upward pressure to be actuated, so as to be a signal of unsafe high speed.

Alternatively, in those cases where there is a connecting rod joining the accelerator pedal to the engine throttle, this invention may be employed as hereinbefore described except that a keyed or slotted base plate which would allow passage of the connecting rod therethrough may be more practically employed. A keyed or slotted base plate such as that described by Armstrong in U.S. Patent 1,483,625 may be employed for such purpose.

From the foregoing it will be understood that the embodiments of the present invention described above are well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and that in certain instances some of the features of the invention may be used without a corresponding use of other features, all without departing from the scope of the invention.

What I claim is:

1. An apparatus for attachment to the accelerator of a motor vehicle which comprises, in combination, a base plate secured to the floorboard of said motor vehicle at a point on a line with the arc of travel of said accelerator pedal; and concentric helical springs secured at one end to the said base plate, one of the said concentric helical springs being of greater length than the other, and the shorter concentric helical spring having attached to the other end thereof an adjustably mounted sleevelike keeper ring to control the point where contact is made with the underside of the accelerator pedal when said pedal is depressed towards the floorboard.

2. An apparatus for attachement to the accelerator pedal of a motor vehicle which comprises, in combination, a base plate secured to the floorboard of said motor vehicle at a point on a line with the arc of travel of said accelerator pedal; concentric helical springs secured at one end to said base plate, and one of said concentric helical springs being of greater length than the other; an adjustably mounted sleevelike keeper ring attached to the other end of the shorter concentric helical spring, and a keeper plate secured to the underside of said accelerator pedal and having attached thereto the other end of the longer concentric helical spring.

3. An apparatus for attachement to the accelerator of a motor vehicle which comprises, in combination, a base plate secured to the floorboard of said motor vehicle at a point on a line with the arc of travel of said accelerator; and concentric helical springs being secured at one end to said base plate; one of the said concentric helical springs being of greater length than the other, and the shorter concentric helical spring having secured to its unsecured end an adjustably mounted sleevelike keeper ring to control the point where contact is made with the underside of the accelerator when said accelerator is depressed towards the floorboard.

References Cited by the Examiner
UNITED STATES PATENTS
2,352,136   6/44   Ten Eyck _____ 74—526 X BROUGHTON G. DURHAM, Primary Examiner.